Figure 1:
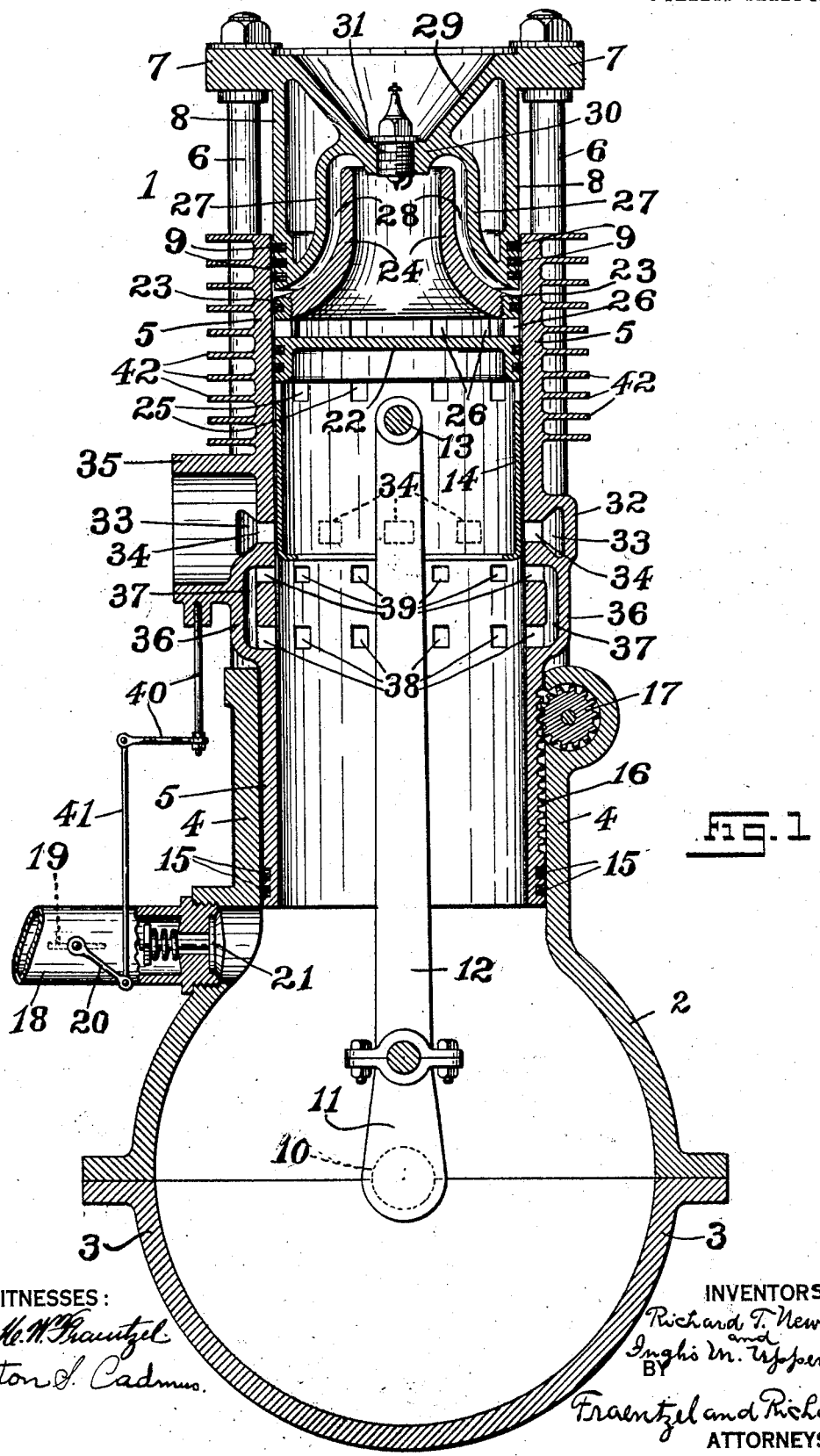

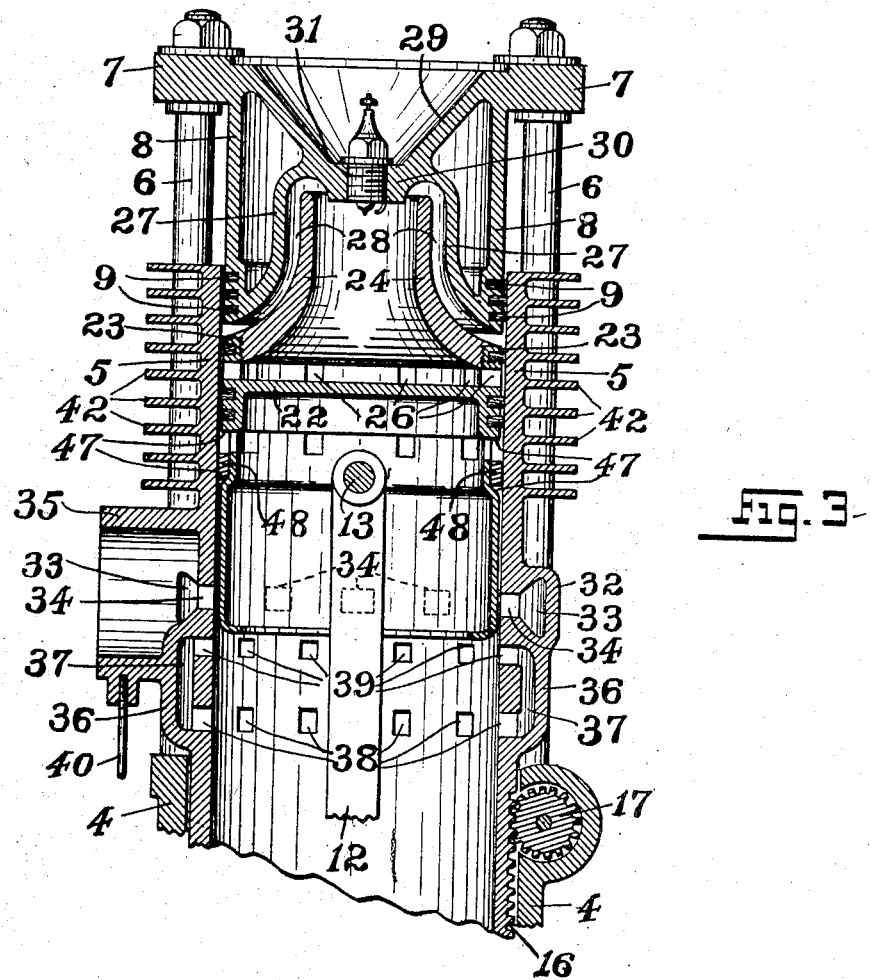

UNITED STATES PATENT OFFICE.

RICHARD T. NEWTON, OF NUTLEY, AND INGLIS M. UPPERCU, OF NEWARK, NEW JERSEY.

INTERNAL-COMBUSTION ENGINE.

1,125,376.  Specification of Letters Patent.  Patented Jan. 19, 1915.

Application filed February 10, 1913. Serial No. 747,248.

*To all whom it may concern:*

Be it known that we, RICHARD T. NEWTON and INGLIS M. UPPERCU, citizens of the United States, residing at Nutley, in the county of Essex and State of New Jersey, and Newark, in the county of Essex and State of New Jersey, respectively, have invented certain new and useful Improvements in Internal-Combustion Engines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in internal combustion or explosive engines; and, the invention has reference, more particularly, to an improved construction of engine-design of the same general class as shown in our co-pending application for Letters-Patent, filed November 27th, 1912, Serial Number 733,775, combining with the cylinder of the engine a novel means for controlling and regulating the admission of the fuel-charges to the firing chamber of the engine, and subsequently exhausting the burnt or spent fuel gases therefrom.

The invention has for its principal object to provide means for controlling, regulating and varying the volume of fuel or gas admitted to the explosion-chamber; and, also to provide means for so directing the influx of the fuel or gas into the explosion-chamber, while the previously burnt fuel is being exhausted therefrom, so that a waste or escape of a part of the fuel-charge is prevented, but still accomplishing a perfect scavenging or clearing out of the burnt or spent gases from the explosive chamber.

Another object of the present invention is to provide an arrangement of gas-ports or passages for the incoming charge of fuel, which may be regulated with relation to the piston-movements of the engine so as to open earlier or later during the piston-stroke, the opening and closing of said ports or passages being governed by the piston itself, whereby a wide scope of engine-speed and power-variation may be obtained, with the minimum expenditure of fuel, thus producing an engine of better efficiency and economy.

Another object of the present invention is to provide in connection with such arrangement of adjustable gas-ports or passages, an automatic means for producing a relative regulation of the volume of fuel drawn from the carbureting device, corresponding to the amount of the working-charge of fuel admitted in accordance with the adjusted position of the entry ports or passages.

Other objects of the present invention not at this time more particularly enumerated will be clearly understood from the following detailed description of the same.

With the various objects of the present invention in view, the said invention consists, primarily, in the novel construction of explosive-engine hereinafter set forth; and, the invention consists, furthermore, in the novel arrangements and combinations of the various devices and parts, as well as in the details of the construction of the same, all of which will be more fully described in the following specification, and then finally embodied in the clauses of the claim which are appended to and which form an essential part of this specification.

The invention is clearly illustrated in the accompanying drawings, in which:—

Figure 2:
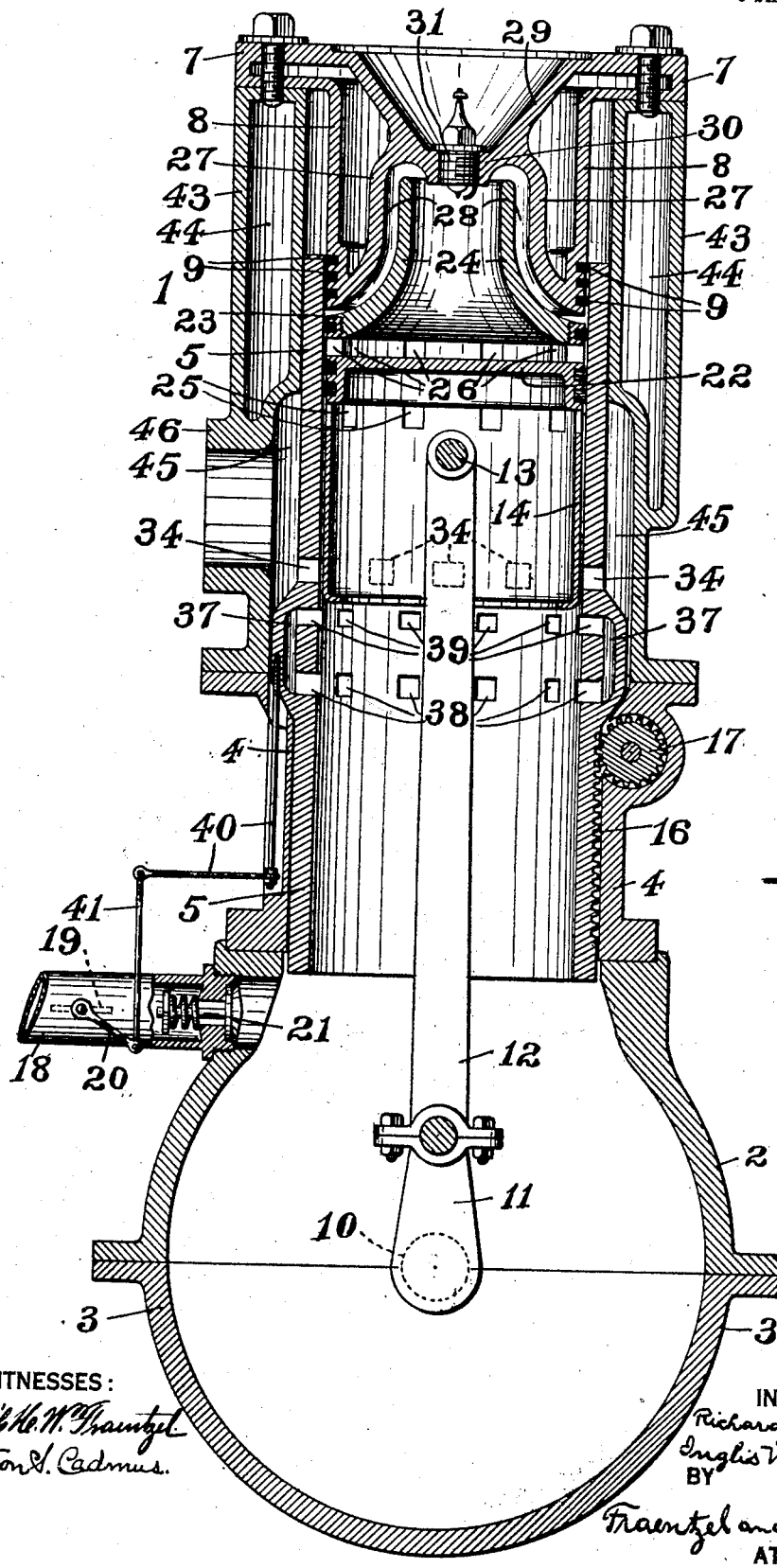

Figure 1 is a vertical longitudinal section of an internal combustion engine made according to and embodying the principles of the present invention; and Fig. 2 is a vertical longitudinal section of a slightly modified form of construction of internal combustion engine, the same, however, being made according to and embodying the principles of the present invention. Fig. 3 is a detail vertical longitudinal section of another modified construction of the novel internal combustion engine.

Similar characters of reference are employed in the said above described views, to indicate corresponding parts.

Referring now to the drawings, the reference-character 1 indicates a complete internal combustion engine made according to and embodying the principles of the present invention, the same comprising a crank-casing 2, the lower half 3 of which is connected therewith in any suitable manner, and the upper portion of said crank-casing 2 having a cylindrical portion 4 in which is mounted, so as to be capable of vertical movement or adjustment, a cylinder-member 5, said movable cylinder-member 5 being open throughout its length. Extending upwardly from the upper end of said cylindrical portion or casing 4 of the crank-casing 2 are a plurality of standards or supports 6, and suitably secured to and supported by the upper ends of said standards or support 6 is a fixed cylinder-head or casting 7, suitably provided with a centrally disposed and downwardly extending cylindrical head-body 8, which corresponds in diameter with the diameter of the bore of said movable cylinder-member 5, and into the upper end of which said head-body 8 enters so that the upper end of said movable cylinder-member is slidably associated therewith. Packing-rings 9 may be provided in the exterior surface of said head-body 8 which engage with the internal sides of said movable cylinder-member 5, in the usual manner, so as to effect a gas-tight joint between said parts, as will be understood.

The reference-character 10 indicates a crank-shaft suitably journaled in said crank-casing. Connected with the crank-portion 11 of said crank-shaft is a pitman 12, the upper end of which is pivotally connected with the cross-head 13 of a piston 14, the latter being slidably related to the internal walls or bore of said movable cylinder-member 5. The lower end of said movable cylinder-member 5, as movably related to the said cylindrical portion or casing 4 of said crank-casing 2, is provided with packing-rings 15 in its external surface, which engages the internal surface of said cylindrical portion or casing 4 in the usual manner, so as to produce a gas-tight joint between said parts. Suitably located in the external surface of the lower end of said movable cylinder-member 5 is a vertically disposed rack-member 16, the same being operatively engaged by a spur-gear 17 which is housed in a portion of said cylindrical portion or casing 4, so that, when the spur-gear is rotated it will communicate its movement to said rack-member 16 and thereby effect the vertical adjusting movements of the said movable cylinder-member 5, for the purposes subsequently to be disclosed. It also follows, that said rack and gear-mechanism when held immovable serves also to maintain said movable cylinder-member 5 in its desired fixed adjusted position. Connected with said crank-casing 2 is a gas-conveying pipe 18 which leads from a carbureter or other source of fuel-supply, and suitably disposed in said pipe 18 is a butter-fly valve-member 19, to the spindle of which is suitably connected an operating lever or arm 20. Also connected in said pipe 18, as it enters said crank-casing 2, is any suitable construction of check-valve 21 adapted to prevent a backward flux of fuel or gas from the interior of said crank-casing through said pipe 18. The said piston 14 is provided at its upper end with a piston-head 22, above which extends a portion 23 of the annular wall of said piston 14. Connected in any suitable manner with said portion 23 of said annular wall, so as to extend above said piston-head 22, and to be centrally disposed with relation to the vertical axis of said piston, is a fuel or gas-guiding means 24, preferably in the form of an inverted funnel-shaped body which is open at its upper end. The walls of said piston 14, immediately beneath said piston-head 22, are provided with a plurality of port-openings 25, which lead from the interior of said piston 14 beneath said piston-head 22. In like manner, the said portion 23 of the walls of said piston 14, immediately above said piston-head 22, are provided with a plurality of port-openings 26 which lead into the interior of said fuel or gas-guiding means 24, above the said piston-head 22. The said cylinder head-body 8 is also provided with an internal wall-portion 27 which conforms substantially with the shape of said fuel or gas-guiding means 24, but which is arranged in such a manner, that when the piston 14 is in its upwardly moved position, an annular space 28 is afforded between the exterior of said fuel or gas-guiding means 24 and said wall-portion 27. The upper body of said cylinder-head casting 7 is depressed, as at 29, to bring its centrally located portion 30 in which is fixed, in the usual manner, the spark-plug 31 of the electric or other ignition-system, in registration with the open mouth of said fuel or gas-guiding means 24 when the piston 14 is in its upwardly moved position. Suitably located in connection with the walls of said movable cylinder-member 5 is an annular portion 32 which provides said cylinder-member with an annular exhaust-passage 33, the walls of said member being further provided with a plurality of exhaust-ports 34 which lead into said annular exhaust-passage 33. Said exhaust-ports 34 being so positioned or staggered with relation to the port-openings 25 and 26 of the piston 14, that said port openings 25 and 26 will not register with said exhaust ports 34 when passing the same. Also formed in connection with the walls of said cylinder-member 5 is an outwardly extending tubular extension 35, with which the said annular exhaust-passage 33 communicates so as to provide an exhaust-outlet for the spent or burnt fuel-gases. Also suitably located beneath said exhaust means, and in connection with the walls of said cylinder-member 5, is an annular portion 36 which provides an annular by-pass or passage 37, extending around said cylinder-member, the walls of the latter being further provided with a plurality of port-openings or passages 38 leading into said by-pass passage 37, and the walls of said cylinder-member being still further provided in a location above said port-openings or passages 38 with a plurality of port-openings or passages 39 leading out of said by-pass passage 37.

As the piston 14 rises in said movable cylinder-member 5, a charge of gas is drawn through the said gas-conveying pipe 18 into the interior of the crank-casing 2. Since the engine operates upon the two cycle principle, a previously introduced charge of fuel or gas within the firing-chamber above the piston is fired when the piston reaches the end of its upward stroke. As the piston descends, under the impulse of this fired or exploded fuel-charge, the charge of fuel or gas taken into the crank-casing 2 is compressed by the downwardly moving piston, and enters the hollow body of the piston, beneath the piston-head 22. As the said piston 14 and the parts connected therewith move downwardly, they eventually pass the said exhaust-ports 34, exposing the same to communication with the interior of said cylinder member above said piston or the firing-chamber, so that the spent or burnt fuel-gases will flow therethrough into said annular exhaust-passage 33, and out of the exhaust outlet formed by said extension 35. Subsequently to the opening of the exhaust-ports and passages, as above described, the piston continues its downward movement until the respective series of port-openings 25 and 26 of the piston-walls aline or register respectively with the series of port-openings 38 and 39 of said cylinder-members, so that the new charge of fuel or gas compressed beneath the downwardly moving piston passes into said by-pass or passage 37 from beneath said piston-head 22, through the registered port-openings 25 and 38, and thence from said by-pass or passage 37, through the registered port-openings 26 and 39 into the interior of the fuel or gas-guiding means 24 above the piston-head 22. The fuel or gas is concentrated by the said fuel or gas-guiding means 24 and is guided thereby, as it enters the firing or explosive-chamber, so as to flow upwardly in a centrally moving stream, which rebounds from the cylinder-head walls upon the volume of spent or burnt gases still remaining therein, and thereby forces or sweeps the latter spent or burnt gases out through the exhaust-ports and passages, replacing the exploded gas with fresh explosive fuel or gas. It will thus be apparent, that the means provided for concentrating and guiding the incoming fuel or gas, causes the same to thoroughly cleanse or scavenge the firing-chamber of the spent or burnt gases without the waste of any portion of the fresh charge of fuel or gas, since the latter is delivered above the volume of spent gases so that the same will be driven out while the fresh fuel or gas is filling the firing-chamber. This arrangement obviates the losses resulting from the escape of portions of the fresh charge of fuel or gases with the burnt gases during exhaust common to engines having their firing-chambers provided with side entrance ports for the gas, whereby the fresh gases mix with the burnt gases which are being exhausted, so that there is a waste or loss of the explosive gas. It follows, therefore, that the construction of gas-intake means provided by the present invention not only prevents waste of a portion of the fresh gas charges entering the firing-chamber, but also adds to the efficiency of the engine by providing a full, clean and fresh charge of gas for each firing impulse.

Another advantage of the construction herein above described is the concentration under compression of a fresh and pure gas-charge directly in contact with the ignition spark-plug 31, as the mouth of said fuel or gas guiding means 24 rises with the piston in registration with said spark-plug.

Referring now to Fig. 1 of the drawings, the movable cylinder member 5 is shown moved to its lowest adjusted position, thereby positioning the gas-intake and exhaust-port openings, so that the same are uncovered or opened by the piston at the lowest point of the downward movement of the latter thus allowing a full or maximum charge of gas to be delivered to the firing-chamber, and timing the exhaust or discharge of the spent or burnt gases at the end of the full working or power-stroke of the piston. As the piston moves upward, it passes over and closes the gas-intake and exhaust-port openings early in the upstroke of the piston, thus permitting the piston to operate to produce a maximum compression of the full charge of fuel or gas introduced into the firing-chamber.

Assuming that it is desired to reduce the quantity of fuel or gas delivered to the firing-chamber to a minimum, and to also reduce to a minimum the compression of each charge in the firing-chamber, the rack and gear-mechanism connected with the movable cylinder-member 5 is operated to shift upward said cylinder-member 5 to the limit of its upward movement, thus advancing or changing the position of the exhaust and gas-intake port-openings with relation to the reciprocating movements of the piston, so that the same are opened earlier in the downward stroke of the piston and closed later in the upward stroke of the same; in other words, the operative or power-stroke of the piston on its descent, and the compression-stroke of the piston on its ascent has been greatly shortened and reduced to a minimum. Thus it will be evident, that the volume of fuel or gas delivered to the firing-chamber is reduced, the compression thereof lessened, and the power-stroke of the piston shortened, all of which results have the effect of throttling down the engine, to decrease the power and the expenditure of gas. It will of course be understood, that said movable cylinder-member 5 may be moved or positioned at any point, intermediate of the above mentioned maximum and minimum, whereby a variation of any intermediate degree of the results above stated may be obtained.

The said butter-fly valve-member 19 in the gas-conveying pipe 18 is automatically operated to open wide or restrict the gas-conduit connected with and entering the crank-casing 2, in correspondence to the maximum and minimum regulation of the gas-charge, as controlled by the adjusted movements of the said movable cylinder-member 5, so that the valve is positioned to permit a free flow of fuel or gas into the crank-casing 2 when the cylinder-member 5 is positioned to pass a full charge into the firing-chamber, but operate to restrict or retard the flow of fuel or gas into the crank-casing 2, when the cylinder-member 5 is positioned to pass a smaller or less quantity of fuel or gas to the firing-chamber. To this end, there is connected with any suitable part of the movable cylinder-member 5, a bracket-member 40, and, pivotally connected with the free end of said bracket-member 40 is one end of a connecting rod 41, the other end of which is pivotally connected with said operating lever or arm 20 of the said butter-fly valve-member 19, whereby the vertical movements of the cylinder-member 5 are correspondingly transmitted to the said lever or arm 20, and the butter-fly valve-member 19 is opened and closed in accordance and synchronously with the movements of the cylinder-member 5.

In the construction of engine shown in Fig. 1, the movable cylinder 5 is air cooled, the same being provided with the annular flanges 42 connected externally with its body for radiating the heat away from the same.

Referring now to Fig. 2 of the accompanying drawings, there is shown therein a slightly modified form of engine embodying the principles of the present invention, but since the construction and arrangement of the principal parts and mechanisms are the same as shown in Fig. 1, the same reference-letters employed in said Fig. 1 are used to denote the corresponding parts, of the engine shown in said Fig. 2, it being necessary to merely point out the slight changes and modifications, and identify the same with additional reference-characters. The main change to be noted in this modified construction is the cooling means for the movable cylinder 5, since instead of air-cooling devices being employed, provision is made for water-cooling. To this end a cylinder-casing 43 is provided which is arranged between the cylindrical portion or casing 4 connected with the upper end of the crank-casing 2 and the cylinder-head casting 7, so that the same surrounds the said movable cylinder 5 which is movably or slidably associated therewith. The said cylinder-casing is provided in its walls with hollow or annular spaces 44 in and through which water may be circulated. By the addition of the cylinder-casing 43, the necessity for the annular portion 32 providing the annular exhaust-passage 33 is obviated, and in place thereof, the said cylinder-casing 43 is provided with an annular space 45 which surrounds the said cylinder-member 5 in a proper position, so that the exhaust-ports 34 of said cylinder-member 5 communicates with or open into the said annular space 45, which thereby provides the annular exhaust passage. Also formed in connection with the walls of said cylinder-casing 43, is an outwardly extending tubular extension 46 with which said annular space 45 communicates so as to provide an exhaust-outlet for the spent or burnt fuel gases.

The principles of operation and the manner of use and manipulation of the construction of engine shown in Fig. 2 are the same as in the type of engine shown in Fig. 1, and described in the foregoing specification; hence, it will not be necessary to the understanding of the same to repeat a description of its operation.

Referring now to Fig. 3 of the accompanying drawings, there is shown therein a slightly modified construction of engine, the modification being found in the construction of the piston. The side walls of the piston 14 at the point where the said port-openings 25 are located are provided with an annular channel or depression 47 externally arranged in said side walls. The width of this channel 47 is at least twice as great as the heighth of said port-openings 25. Arranged in said channel 47 so as to move slidably from side to side of the same, which would be to move vertically or longitudinally of said piston, is a cut-off ring 48, the width of the same being slightly greater than the heighth of said port-openings 25. Said cut-off ring 48 has a slight frictional engagement with the walls of the cylinder-member 5. In operation, when the piston 14 moves downward in the cylinder-member 5 the cut-off ring 48 frictionally engaging the cylinder walls will be caused to move toward and to register over said port-openings 25, thus closing the latter while the piston moves downward, and thus blocking or preventing the passage of fresh fuel or gas above said piston-head by way of the piston port-openings and by-pass passage of the cylinder during the downward movement of the piston, but when the piston moves upwardly in the said cylinder-members a reverse action of said cut-off ring 48 ensues which causes the same to move to the opposite or lower side of said channel 47 thus exposing or opening said port openings 25, so that when the port-openings 25 and 26 of said piston 14 register with the by-pass passage of said cylinder-member on the up stroke of the piston the fresh fuel or gas may freely pass therethrough and above the piston-head. The advantage of such an arrangement is that time is thereby given for complete combustion and exhausting of the preceding charge of fuel, before the next charge is permitted to enter the firing chamber. This result is particularly advantageous when the cylinder-member is adjusted upward to such a position that the piston in its downward stroke passes the by-pass passages of the cylinder, and again passes the same when the piston moves upward, since it confines the fuel intake operations to the up-stroke of the piston.

We are aware that some changes may be made in the general arrangements and combinations of the several devices and parts, as well as in the details of the construction of the same, without departing from the scope of the present invention as set forth in the foregoing specification. Hence, we do not limit our present invention to the exact arrangements and combinations of the various devices and parts as described in the said specification, nor do we confine ourselves to the exact arrangements or details of the construction of the said parts as illustrated in the accompanying drawings.

We claim:—

1. An internal combustion engine comprising a crank-casing having a gas-intake, a cylinder head casting supported above said crank-casing, a cylinder having a by-pass passage communicating with the interior of said crank-casing and an exhaust port, mounted to move axially between said crank-casing and said cylinder-head casting, and a piston provided with a port below its head adapted to be registered with said by-pass passage, said piston controlling the opening and closing of said by-pass passage and said exhaust port.

2. An internal combustion engine comprising a crank-casing having a gas-intake, a cylinder head casting supported above said crank-casing, a cylinder having a by-pass passage communicating with the interior of said crank-casing and an exhaust port, mounted to move axially between said crank-casing and said cylinder-head casting, a piston provided with a port below its head adapted to be registered with said by-pass passage, said piston controlling the opening and closing of said by-pass passage and said exhaust port, and means for adjusting said cylinder axially with relation to said piston.

3. An internal combustion engine comprising a crank-casing, a gas-intake pipe leading into said crank-casing, a valve-mechanism in said intake-pipe, a vertically movable cylinder having a by-pass passage communicating with the interior of said crank-casing and an exhaust port, a piston controlling said by-pass passage and exhaust port, and means interconnecting said movable cylinder and said valve-mechanism of said intake-pipe to operate the latter synchronously with the movements of the former.

4. An internal combustion engine comprising a crank-casing, a gas-intake pipe leading into said crank-casing, a valve-mechanism in said intake-pipe, a vertically movable cylinder having a by-pass passage communicating with the interior of said crank-casing and an exhaust port, a piston provided with a port below its head adapted to be registered with said by-pass passage, said piston controlling the opening and closing of said by-pass passage and said exhaust-port, and means inter-connecting said movable cylinder and said valve-mechanism of said intake pipe to operate the latter synchronously with the movement of the former.

5. An internal combustion engine comprising a crank-casing, a gas-intake pipe leading into said crank-casing, a valve-mechanism in said intake-pipe, a vertically movable cylinder having a by-pass passage communicating with the interior of said crank-casing and an exhaust port, a piston provided with a port below its head adapted to be registered with said by-pass passage, said piston controlling the opening and closing of said by-pass passage and said exhaust-port, means inter-connecting said movable cylinder and said valve-mechanism of said intake pipe to operate the latter synchronously with the movement of the former, and means for adjusting said cylinder axially with relation to said piston to vary the time of operation of said by-pass passage and exhaust port, earlier or later during the piston-stroke.

6. An internal combustion engine comprising a crank-casing, a gas-intake pipe leading into said crank-casing, a valve-mechanism in said intake-pipe, a cylinder-head casting supported above said crank-casing, a cylinder having a by-pass passage communicating with the interior of said crank-casing and an exhaust port mounted to move axially between said crank-casing and said cylinder-head casting, a piston provided with a port below its head adapted to be registered with said by-pass passage, said piston controlling the opening and closing of said by-pass passage and said exhaust-port, and means interconnecting said movable cylinder and said valve-mechanism of said intake-pipe to operate the latter synchronously with the movement of the former.

7. An internal combustion engine comprising a crank-casing, a gas-intake pipe leading into said crank-casing, a valve-mechanism in said intake-pipe, a cylinder-head casting supported above said crank-casing, a cylinder having a by-pass passage communicating with the interior of said crank-casing and an exhaust port mounted to move axially between said crank-casing and said cylinder-head casting, a piston provided with a port below its head adapted to be registered with said by-pass passage, said piston controlling the opening and closing of said by-pass passage and said exhaust-port, means interconnecting said movable cylinder and said valve-mechanism of said intake-pipe to operate the latter synchronously with the movement of the former, and means for adjusting said cylinder axially with relation to said piston to vary the lead of said by-pass passage and exhaust-port.

8. An internal combustion engine comprising a crank-casing provided with a gas-intake, a cylinder-head casting, a cylinder mounted to move vertically between said crank-casing and said cylinder-head casting, said cylinder having an intake by-pass passage communicating with the interior of said crank-casing and an exhaust-port, a hollow piston having a head adjacent to its upper end, said piston having in its walls a port above and below its head adapted to register with said by-pass passage, and a gas-guiding means connected with the upper end of said piston in communication with its upper port adapted to guide the entering charge of fuel into the cylinder above the piston in a centrally flowing and upwardly moving stream, said piston controlling the opening and closing of said by-pass passage and exhaust-port, and means for adjusting said cylinder axially with relation to said piston to vary the lead of said by-pass passage and exhaust-port.

9. An internal combusition engine comprising a crank-casing, a gas-intake pipe leading into said crank-casing, a valve-mechanism in said intake-pipe, a vertically movable cylinder having a by-pass passage communicating with the interior of said crank-casing and an exhaust port, a hollow piston having a head adjacent to its upper end, said piston having in its walls a port above and below its head adapted to register with said by-pass passage, a gas-guiding means connected with the upper end of said piston in communication with its upper port adapted to guide the entering charge of fuel into the cylinder above the piston in a centrally flowing and upwardly moving stream, said piston controlling the opening and closing of said by-pass passage and exhaust-port, means for adjusting said cylinder axially with relation to said piston to vary the lead of said by-pass passage and exhaust-port, and means inter-connecting said movable cylinder and said valve-mechanism of said intake-pipe to operate the latter synchronously with the movement of the former.

10. An internal combustion engine comprising a crank-casing having a gas-intake, a cylinder-head casting supported above said crank-casing provided with a downwardly extending cylindrical head-member, a cylindrical casing-portion connected with the upper end of said crank-casing, a vertically movable cylinder-member having a by-pass passage communicating with the interior of said crank-casing and an exhaust-port, the upper end of said cylinder-member being slidably associated with said cylindrical head-member of said cylinder-head casting, the lower end of said cylinder-member being slidably associated with said cylindrical casing of said crank-casing, and a piston provided with a port below its head adapted to be registered with said by-pass passage, said piston controlling the opening and closing of said by-pass passage and said exhaust-port.

11. An internal combustion engine comprising a crank-casing having a gas-intake, a cylinder-head casting supported above said crank-casing provided with a downwardly extending cylindrical head-member, a cylindrical casing-portion connected with the upper end of said crank-casing, a vertically movable cylinder-member having a by-pass passage communicating with the interior of said crank-casing and an exhaust-port, the upper end of said cylinder-member being slidably associated with said cylindrical head-member of said cylinder-head casting, the lower end of said cylinder-member being slidably associated with said cylindrical casing of said crank-casing, a piston provided with a port below its head adapted to be registered with said by-pass passage, said piston controlling the opening and closing of said by-pass passage and said exhaust-port, and means for adjusting said cylinder axially with relation to said piston to vary the lead of said by-pass passage and exhaust-port.

12. An internal combustion engine comprising a crank-casing, a gas-intake pipe leading into said crank-casing, a valve-mechanism in said intake pipe, a cylinder-head casting supported above said crank-casing provided with a downwardly extending cylindrical head-member, a cylindrical casing-portion connected with the upper end of said crank-casing, a vertically movable cylinder-member having a by-pass passage communicating with the interior of said crank-casing and an exhaust port, the upper end of said cylinder-member being slidably associated with said cylindrical head-member of said cylinder-head casting, the lower end of said cylinder-member being slidably associated with said cylindrical casing of said crank-casing, a piston provided with a port below its head adapted to be registered with said by-pass passage, said piston controlling the opening and closing of said by-pass passage and said exhaust-port, and means interconnecting said movable cylinder-member and said valve-mechanism of said intake pipe to operate the latter synchronously with the movement of the former.

13. An internal combustion engine comprising a crank-casing, a gas-intake pipe leading into said crank-casing, a valve-mechanism in said intake pipe, a cylinder-head casting supported above said crank-casing provided with a downwardly extending cylindrical head-member, a cylindrical casing-portion connected with the upper end of said crank-casing, a vertically movable cylinder-member having a by-pass passage communicating with the interior of said crank-casing and an exhaust port, the upper end of said cylinder-member being slidably associated with said cylindrical head-member of said cylinder-head casting, the lower end of said cylinder-member being slidably associated with said cylindrical casing of said crank-casing, a piston provided with a port below its head adapted to be registered with said by-pass passage, said piston controlling the opening and closing of said by-pass passage and said exhaust-port, means interconnecting said movable cylinder-member and said valve-mechanism of said intake pipe to operate the latter synchronously with the movement of the former, and means for adjusting said cylinder axially with relation to said piston to vary the lead of said by-pass passage and exhaust-port.

14. An internal combustion engine comprising a crank-casing, a gas-intake pipe leading into said crank-casing, a valve mechanism in said intake pipe, a cylinder-head casting supported above said crank-casing provided with a downwardly extending cylindrical head-member, a cylindrical casing-portion connected with the upper end of said crank-casing, a vertically movable cylinder-member having a by-pass passage communicating with the interior of said crank-casing and an exhaust port, the upper end of said cylinder-member being slidably associated with said cylindrical head-member of said cylinder-head casting, the lower end of said cylinder-member being slidably associated with said cylindrical casing of said crank-casing, a hollow piston having a head adjacent to its upper end, said piston having in its walls a port above and below its head adapted to register with said by-pass passage, and a gas-guiding means connected with the upper end of said piston in communication with its upper port adapted to guide the entering charge of fuel into the cylinder above the piston in a centrally flowing and upwardly moving stream, said piston controlling the opening and closing of said by-pass passage and said exhaust-port.

15. An internal combustion engine comprising a crank-casing, a gas-intake pipe leading into said crank-casing, a valve-mechanism in said intake pipe, a cylinder-head casting supported above said crank-casing provided with a downwardly extending cylindrical head-member, a cylindrical casing-portion connected with the upper end of said crank-casing, a vertically movable cylinder-member having a by-pass passage communicating with the interior of said crank-casing and an exhaust port, the upper end of said cylinder-member being slidably associated with said cylindrical head-member of said cylinder-head casting, the lower end of said cylinder-member being slidably associated with said cylindrical casing of said crank-casing, a hollow piston having a head adjacent to its upper end, said piston having in its walls a port above and below its head adapted to register with said by-pass passage, a gas-guiding means connected with the upper end of said piston in communication with its upper port adapted to guide the entering charge of fuel into the cylinder above the piston in a centrally flowing and upwardly moving stream, said piston controlling the opening and closing of said by-pass passage and said exhaust-port, and means for adjusting said cylinder-member axially with relation to said piston to vary the lead of said by-pass passage and exhaust-port.

16. An internal combustion engine comprising a crank-casing, a gas-intake pipe leading into said crank-casing, a valve-mechanism in said intake pipe, a cylinder-head casting supported above said crank-casing provided with a downwardly extending cylindrical head-member, a cylindrical casing-portion connected with the upper end of said crank-casing, a vertically movable cylinder-member having a by-pass passage communicating with the interior of said crank-casing and an exhaust port, the upper end of said cylinder-member being slidably associated with said cylindrical head-member of said cylinder-head casting, the lower end of said cylinder-member being slidably associated with said cylindrical casing of said crank-casing, a hollow piston having a head adjacent to its upper end, said piston having in its walls a port above and below its head adapted to register with said by-pass passage, a gas-guiding means connected with the upper end of said piston in communication with its upper port adapted to guide the entering charge of fuel into the cylinder above the piston in a centrally flowing and upwardly moving stream, said piston controlling the opening and closing of said by-pass passage and said exhaust-port, means for adjusting said cylinder-member axially with relation to said piston to vary the lead of said by-pass passage and exhaust-port, and means interconnecting said movable cylinder-member and said valve-mechanism of said intake pipe to operate the latter synchronously with the movement of the former.

17. An internal combustion engine comprising a crank-casing, a gas-intake pipe leading into said crank-casing, a valve-mechanism in said intake pipe, a cylinder-head casting supported above said crank-casing provided with a downwardly extending cylindrical head-member, a cylindrical casing-portion connected with the upper end of said crank-casing, a vertically movable cylinder-member having a by-pass passage communicating with the interior of said crank-casing and an exhaust port, the upper end of said cylinder-member being slidably associated with said cylindrical head-member of said cylinder-head casting, the lower end of said cylinder-member being slidably associated with said cylindrical casing of said crank-casing, a hollow piston having a head adjacent to its upper end, said piston having in its walls a port above and below its head adapted to register with said by-pass passage, a gas-guiding means connected with the upper end of said piston in communication with its upper port adapted to guide the entering charge of fuel into the cylinder above the piston in a centrally flowing and upwardly moving stream, said piston controlling the opening and closing of said by-pass passage and said exhaust-port, and means interconnecting said movable cylinder-member and said valve mechanism of said intake pipe to operate the latter synchronously with the movement of the former.

In testimony, that we claim the invention set forth above we have hereunto set our hands this 29th day of January, 1913.

RICHARD T. NEWTON.
INGLIS M. UPPERCU.

Witnesses:
  Fred'k I. Fraentzel,
  Fred'k H. W. Fraentzel.